(12) United States Patent
Mariappan et al.

(10) Patent No.: US 12,554,117 B2
(45) Date of Patent: Feb. 17, 2026

(54) ALTERABLE OPTICAL STRUCTURES

(71) Applicant: General Electric Company, Schenectady, NY (US)

(72) Inventors: Dhanushkodi Durai Mariappan, Guiderland, NY (US); Gregory Daniel Dreifus, Troy, NY (US); Xiaopeng Li, Rexford, NY (US); James William Bray, Niskayuna, NY (US); Greg Alan Radighieri, Sunnyvale, TX (US)

(73) Assignee: GE Infrastructure Technology LLC, Greenville, SC (US)

( * ) Notice: Subject to any disclaimer, the term of this patent is extended or adjusted under 35 U.S.C. 154(b) by 425 days.

(21) Appl. No.: 18/188,198

(22) Filed: Mar. 22, 2023

(65) Prior Publication Data

US 2024/0319491 A1    Sep. 26, 2024

(51) Int. Cl.
| | |
|---|---|
| G02B 26/00 | (2006.01) |
| G02B 1/00 | (2006.01) |
| G02F 1/00 | (2006.01) |
| B33Y 80/00 | (2015.01) |
| G02F 1/09 | (2006.01) |
| H02S 40/22 | (2014.01) |

(52) U.S. Cl.
CPC .......... *G02B 26/004* (2013.01); *G02B 1/005* (2013.01); *G02F 1/0036* (2013.01); *G02F 1/0081* (2013.01); *B33Y 80/00* (2014.12); *G02B 2207/107* (2013.01); *G02F 1/09* (2013.01); *G02F 2202/36* (2013.01); *H02S 40/22* (2014.12)

(58) Field of Classification Search
CPC .................. G02B 1/005; G02B 26/004; G02B 2207/107; G02F 1/0036; G02F 1/0081; G02F 1/09; G02F 2202/36; H02S 40/22; B33Y 80/00
USPC ................................ 359/290, 291, 297, 665
See application file for complete search history.

(56) References Cited

U.S. PATENT DOCUMENTS

| | | | |
|---|---|---|---|
| 8,810,882 B2 * | 8/2014 | Heikenfeld | B01L 3/502792 359/228 |
| 2013/0335807 A1 * | 12/2013 | Arsenault | G02F 1/0128 264/2.7 |
| 2014/0153079 A1 * | 6/2014 | Hsieh | G09G 3/3453 359/290 |
| 2015/0260982 A1 | 9/2015 | Sangu | |
| 2018/0364487 A1 | 12/2018 | Yeoh et al. | |

FOREIGN PATENT DOCUMENTS

EP    2738588 A1    6/2014

OTHER PUBLICATIONS

Extended European Search Report received Sep. 9, 2024 for EP24159994; 8 pps.

* cited by examiner

*Primary Examiner* — Mahidere S Sahle
(74) *Attorney, Agent, or Firm* — Armstrong Teasdale LLP

(57) ABSTRACT

Described herein are alterable optical structures. Also described herein are methods of altering same.

12 Claims, 6 Drawing Sheets

ALTERABLE OPTICAL STRUCTURES

FEDERAL RESEARCH STATEMENT

The subject matter of this disclosure was made with Government support under Contract No. FA237724CB010, awarded by the Defense Advanced Research Projects Agency (DARPA), and the Government has certain rights in the subject matter claimed herein.

BACKGROUND

The field of the disclosure relates generally to alterable optical structures and methods of altering same.

Optical structures are useful in a wide variety of optical applications. For example, such structures are an integral part of lasers, microscopes, telescopes, cameras, solar collectors, and solar cells. Moreover, optical structures are often used to manipulate light such as through reflection, absorption, splitting, or focusing. Because of the precision necessary for their use, optical structures are generally permanent and must be precisely formed. As a result, manufacturing such structures may be time-consuming and expensive, and such structures may not be readily altered.

In addition, the field of adaptive optics repeatedly and often changes optics for such purposes as atmospheric correction of imaging. There is also a need for concentrated solar power technology utilizing adaptive optics to be able to increase the efficiency of power energy collection at different time of a day.

Accordingly, there is a need for inexpensive optical structures that may be quickly and repeatedly altered.

BRIEF DESCRIPTION

In one aspect, a first alterable optical structure is provided. The first alterable optical structure includes a fluid reservoir, a porous structure, and at least one valve configured to selectively control fluid communication between the fluid reservoir and the porous structure. The fluid reservoir includes at least one fluid and at least one optical surface extending at least partially across an upper surface of the at least one fluid. When the at least one valve is open, the at least one fluid can move through the porous structure via capillary action.

In another aspect, a method of altering a first alterable optical structure is provided. The first alterable optical structure includes a fluid reservoir, a porous structure, and at least one valve configured to selectively control fluid communication between the fluid reservoir and the porous structure. The fluid reservoir includes at least one fluid and at least one optical surface extending at least partially across an upper surface of the at least one fluid. When the at least one valve is open, the at least one fluid can move through the porous structure via capillary action. The method includes opening the at least one valve to enable the at least one fluid to flow through the porous structure via capillary action.

In another aspect, a second alterable optical structure is provided. The second alterable optical structure includes a fluid reservoir, a structure oriented to receive at least one magnetically manipulable fluid, a magnetic field source oriented to magnetically manipulate the at least one magnetically manipulable fluid, and at least one valve configured to selectively control fluid communication between the fluid reservoir and the structure. The fluid reservoir includes at least one magnetically manipulable fluid and at least one optical surface extending at least partially across an upper surface of the at least one magnetically manipulable fluid. When the at least one valve is open, the at least one fluid can move through the structure via a magnetic force induced by the magnetic field source.

In another aspect, a method of altering a second alterable optical structure is provided. The second alterable optical structure includes a fluid reservoir, a structure oriented to receive at least one magnetically manipulable fluid, a magnetic field source oriented to magnetically manipulate the at least one magnetically manipulable fluid, and at least one valve configured to selectively control fluid communication between the fluid reservoir and the structure. The fluid reservoir includes at least one magnetically manipulable fluid and at least one optical surface extending at least partially across an upper surface of the at least one magnetically manipulable fluid. When the at least one valve is open, the at least one fluid can move through the structure via a magnetic force induced by the magnetic field source. The method includes opening the at least one valve to enable the at least one fluid to flow through the structure via a magnetic force induced by the magnetic field source.

In another aspect, a third alterable optical structure is provided. The third optical structure includes a structure containing: at least one magnetically manipulable fluid; at least one optical surface extending at least partially across an upper surface of the at least one magnetically manipulable fluid; and a magnetic field source oriented to magnetically manipulate the at least one magnetically manipulable fluid.

In another aspect, a method of altering a third alterable optical structure is provided. The alterable optical structure includes a structure containing: at least one magnetically manipulable fluid; at least one optical surface extending at least partially across an upper surface of the at least one magnetically manipulable fluid; and a magnetic field source oriented to magnetically manipulate the at least one magnetically manipulable fluid. The method includes inducing a magnetic force from the magnetic field source to magnetically manipulate the at least one magnetically manipulable fluid.

In another aspect, a fourth alterable optical structure is provided. The fourth alterable optical structure includes at least one metamaterial, at least one magnetically manipulable fluid disposed on the metamaterial, and a magnetic field source oriented to magnetically manipulate the at least one magnetically manipulable fluid.

In another aspect, a method of altering a fourth alterable optical structure is provided. The fourth alterable optical structure includes at least one metamaterial, at least one magnetically manipulable fluid disposed on the metamaterial, and a magnetic field source oriented to magnetically manipulate the at least one magnetically manipulable fluid. The method includes magnetically manipulating the at least one magnetically manipulable fluid to alter at least one optical property of the alterable optical structure.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1A:
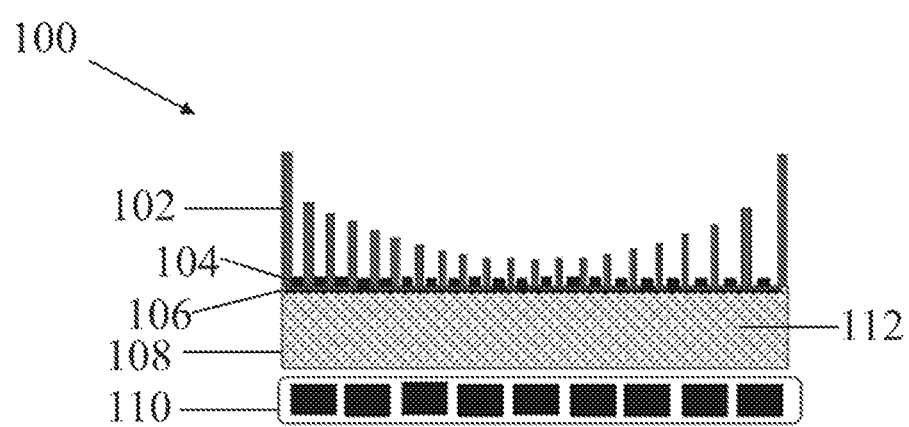
FIG. 1A is an exemplary alterable optical structure in accordance with the present disclosure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein overcome at least some of the disadvantages of known optical structures. The exemplary embodiments described herein include a first alterable optical structure. The alterable optical structure includes a fluid reservoir, a porous structure, and at least one valve configured to selectively control fluid communication between the fluid reservoir and the porous structure. The fluid reservoir includes at least one fluid and at least one optical surface positioned on a surface of the at least one fluid. When the at least one valve is open, the at least one fluid is allowed to move through the porous structure via capillary action. The exemplary embodiments described herein facilitate producing optical structures that are alterable and tunable by a variety of applied forces.

In some embodiments, the at least one fluid can receive at least one force sufficient to overcome the force of gravity. Generally, the at least one force may be any suitable force known in the art that facilitates selectively altering the alterable optical structure described herein. In some embodiments, the at least one force is, but is not limited to only being, a magnetic force, an inertial force, a capillary force, and/or any combination thereof. In some embodiments, the alterable optical structure is oriented such that the porous structure is above the fluid reservoir, horizontally adjacent to the fluid reservoir, below the fluid reservoir, or a combination thereof.

In some embodiments, the inertial force is a centripetal force from rotation.

In some embodiments, the alterable optical structure also includes a magnetic field source oriented to magnetically manipulate the at least one fluid. Generally, the magnetic field source may be any suitable magnetic field source known in the art that facilitates selectively altering the alterable optical structure described herein. In some embodiments, the magnetic field source is one of, but is not limited to only being, a permanent magnet, an electromagnet, a paramagnet, a ferromagnetic material, a rare-earth magnet, and combinations thereof. In some embodiments, the magnetic field source includes a Halbach array.

In some embodiments, the at least one fluid includes a magnetically manipulable fluid. In some embodiments, the at least one fluid includes a ferrofluid.

In some embodiments, the at least one fluid includes a non-ferrofluid. In these embodiments, the non-ferrofluid is not magnetically manipulable.

In some embodiments, the porous structure is rotatable to inertially manipulate the at least one fluid.

In some embodiments, the porous structure is a mesoporous structure. In some embodiments, the porous structure includes pores having average diameters in a range of from about 1 nm to about 1 mm. In some embodiments, the porous structure includes pores having average diameters in a range of from about 1 µm to about 500 µm. In some embodiments, the porous structure includes pores having average diameters in a range of from about 100 µm to about 200 µm. In some embodiments, the porous structure includes pores having average diameters in a range of from about 5 µm to about 10 µm.

In some embodiments, the porous structure includes wick-like structures.

In some embodiments, the porous structure includes a material selected from the group consisting of metals, polymers, ceramics, metamaterials, hyperbolic metamaterials, hydrophobic materials, hydrophobic coatings, hydrophilic materials, hydrophilic coatings, and combinations thereof.

In some embodiments, the porous structure is produced by additive manufacturing. In some embodiments, the porous structure is produced by polymer-based additive manufacturing. In some embodiments, the porous structure is produced by metal-based additive manufacturing. In some embodiments, the porous structure is produced by ceramic-based additive manufacturing.

In some embodiments, the at least one optical surface includes an optical surface selected from the group consisting of lenses, optical structures, photonic structures, mirrors, optical films, reflective optical films, metal liquid-like films (MELLFs), silver films, metamaterials, hyperbolic metamaterials, solar cells, and combinations thereof. In some embodiments, the at least one optical surface includes an optical surface selected from the group consisting of lenses, optical structures, photonic structures, mirrors, optical films, reflective optical films, metal liquid-like films (MELLFs), silver films, metamaterials, and combinations thereof.

In some embodiments, the at least one optical surface is shaped as a geometric shape, a non-geometric shape, a paraboloid, an ellipsoid, a sphere, and/or combinations thereof. In other embodiments, the optical surface may be formed with any shape that enables the optical structure to function as described herein. In other embodiments, the optical surface is formed with a combination of various shapes at different locations.

In some embodiments, the alterable optical structure is a liquid mirror for use in a telescope. In some embodiments, the alterable optical structure is a liquid mirror for use in a solar energy system.

FIG. 1A depicts an exemplary alterable optical structure 100 in accordance with the present disclosure. The alterable optical structure 100 includes a porous structure 102 above a fluid reservoir 108. The fluid reservoir 108 contains a fluid 112 and an optical surface 106 extending at least partially across an upper surface of the fluid 112. Fluid communication between the porous structure 102 and the fluid reservoir 108 is controlled via valves 104. In the exemplary embodiment, a magnetic field source 110 is below the fluid reservoir 108. As depicted, the valves 104 are closed and the optical surface 106 and fluid 112 are contained within the fluid reservoir 108.

Figure 1B:
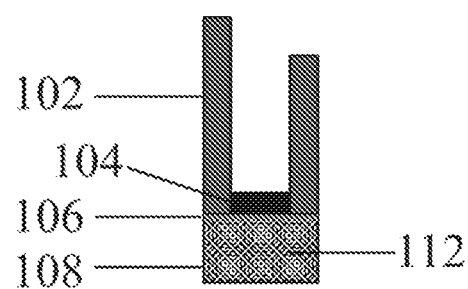
FIG. 1B is an exemplary pore of an alterable optical structure in accordance with the present disclosure.

FIG. 1B depicts an exemplary pore of the porous structure 102 of the alterable optical structure 100. The porous structure 102 is above a fluid reservoir 108 that contains a fluid 112 and where an optical surface 106 extends at least partially across the fluid 112. Fluid communication between the porous structure 102 and the fluid reservoir 108 is controlled via valve 104. Moreover, in the exemplary embodiment, a magnetic field source (not shown) is below the fluid reservoir 108. As depicted, the valve 104 is closed and the optical surface 106 and fluid 112 are contained within the fluid reservoir 108.

Figure 1C:
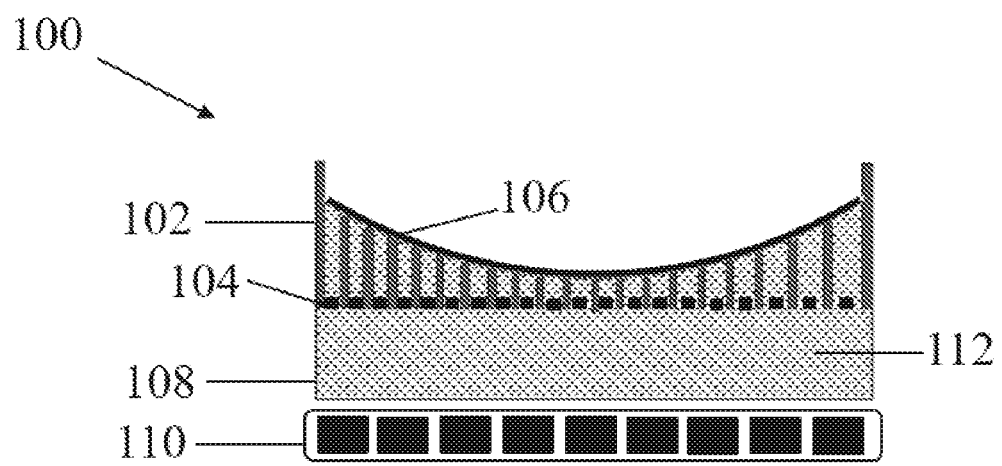
FIG. 1C is an alternative alterable optical structure in accordance with the present disclosure.

FIG. 1C depicts another exemplary alterable optical structure 100 in accordance with the present disclosure. In the exemplary embodiment, the alterable 190 optical structure 100 includes a porous structure 102 above a fluid reservoir 108 containing a fluid 112. Fluid communication between the porous structure 102 and the fluid reservoir 108 is controlled by valves 104. A magnetic field source 110 is below the fluid reservoir 108. As depicted, the valves 104 are open, the fluid 112 is partially contained with the fluid reservoir 108 and partially in the porous structure 102, and the optical surface 106 extends at least partially across the top surface of the fluid 112 in the porous structure 102. The optical surface 106 forms a shape based on the meniscus of the fluid 112.

Figure 1D:
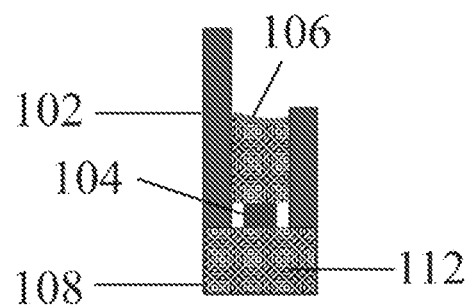
FIG. 1D is an exemplary pore of an alterable optical structure in accordance with the present disclosure.

FIG. 1D depicts an exemplary pore of the porous structure 102 of the alterable optical structure 100. The porous structure 102 is above a fluid reservoir 108 containing a fluid 112. Fluid communication between the porous structure 102 and the fluid reservoir 108 is controlled by a valve 104. A magnetic field source (not shown) is below the fluid reservoir 108. As depicted, the valve 104 is open, the fluid 112 is partially contained with the fluid reservoir 108 and is partially within the porous structure 102, and the optical surface 106 extends across the top surface of the fluid 112 in the porous structure 102. The optical surface 106 forms a shape based on the meniscus of the fluid 112.

The exemplary embodiments described herein include a first method of altering an alterable optical structure. The first method includes opening the at least one valve to enable the at least one fluid to flow through the porous structure via capillary action.

In some embodiments, the method also includes magnetically manipulating the at least one fluid with a magnetic field source. In such embodiments, the at least one fluid is a magnetically manipulable fluid. Generally, the magnetic field source may be any suitable magnetic field source known in the art that facilitates the alterable optical structure to be selectively altered as described herein. In some embodiments, the magnetic field source is selected from the group consisting of, but is not limited to only being, a permanent magnet, an electromagnet, a paramagnet, a ferromagnetic material, and/or combinations thereof. In some embodiments, the magnetic field source includes a Halbach array.

In some embodiments, the method further includes rotating the porous structure to inertially manipulate the at least one magnetically manipulable fluid.

The exemplary embodiments described herein include a second alterable optical structure. The second alterable optical structure includes a fluid reservoir, a structure oriented to receive at least one magnetically manipulable fluid, a magnetic field source oriented to magnetically manipulate the at least one magnetically manipulable fluid, and at least one valve configured to selectively control fluid communication between the fluid reservoir and the structure. The fluid reservoir includes at least one magnetically manipulable fluid and at least one optical surface extending at least partially across a surface of the at least one magnetically manipulable fluid. When the at least one valve is open, the at least one fluid can flow through the structure via a magnetic force induced by the magnetic field source. The exemplary embodiments described herein facilitate producing optical structures that are alterable and tunable by a variety of applied forces.

In some embodiments, the at least one magnetically manipulable fluid receives at least one force sufficient to overcome the force of gravity. Generally, the at least one force may be any suitable force known in the art that facilitates altering the alterable optical structure described herein. In some embodiments, the at least one force is selected from the group consisting of, but is not limited to only being, magnetic forces, inertial forces, capillary forces, and/or combinations thereof. In some embodiments, the alterable optical structure is oriented such that the structure is above the fluid reservoir, is horizontally adjacent to the fluid reservoir, is below the fluid reservoir, and/or some combination thereof.

In some embodiments, the at least one magnetically manipulable fluid includes a ferrofluid.

In some embodiments, the at least one fluid includes a non-ferrofluid. In these embodiments, the non-ferrofluid is not magnetically manipulable.

In some embodiments, the structure is rotatable to inertially manipulate the at least one magnetically manipulable fluid.

In some embodiments, the structure includes a porous structure. In some embodiments, the porous structure is a mesoporous structure. In some embodiments, the porous structure includes pores having average diameters in a range of from about 1 nm to about 1 mm.

In some embodiments, the porous structure includes wick-like structures.

In some embodiments, the structure includes a material selected from the group consisting of, but is not limited to only being, metals, polymers, ceramics, metamaterials, hyperbolic metamaterials, hydrophobic materials, hydrophobic coatings, hydrophilic materials, hydrophilic coatings, and/or combinations thereof.

In some embodiments, the structure is produced by additive manufacturing. In some embodiments, the structure is produced by polymer-based additive manufacturing. In some embodiments, the structure is produced by metal-based additive manufacturing. In some embodiments, the structure is produced by ceramic-based additive manufacturing.

In some embodiments, the at least one optical surface includes an optical surface selected from the group consisting of lenses, optical structures, photonic structures, mirrors, optical films, reflective optical films, metal liquid-like films (MELLFs), silver films, metamaterials, hyperbolic metamaterials, solar cells, and/or combinations thereof. In some embodiments, the at least one optical surface includes an optical surface selected from the group consisting of lenses, optical structures, photonic structures, mirrors, optical films, reflective optical films, metal liquid-like films (MELLFs), silver films, metamaterials, and/or combinations thereof.

In some embodiments, the at least one optical surface is shaped as a geometric shape, a non-geometric shape, a paraboloid, an ellipsoid, a sphere, and/or combinations thereof. In other embodiments, the optical surface may be formed with any shape that enables the optical structure to function as described herein. In other embodiments, the optical surface is formed with a combination of various shapes at different locations.

In some embodiments, the alterable optical structure is a liquid mirror for use in a telescope. In some embodiments, the alterable optical structure is a liquid mirror for use in a solar energy system.

The exemplary embodiments described herein include a second method of altering an alterable optical structure. The second method includes opening the at least one valve to enable the at least one fluid to flow through the structure via a magnetic force induced by the magnetic field source.

In some embodiments, the method also includes moving the at least one magnetically manipulable fluid through the structure via capillary action, wherein the structure includes a porous structure.

In some embodiments, the method further includes rotating the structure to inertially manipulate the at least one magnetically manipulable fluid.

The exemplary embodiments described herein include a third exemplary alterable optical structure. The third alterable optical structure includes a structure containing: at least one magnetically manipulable fluid; at least one optical surface extending at least partially across a surface of the at least one magnetically manipulable fluid; and a magnetic field source oriented to magnetically manipulate the at least one magnetically manipulable fluid. The exemplary embodiments described herein facilitate producing optical structures that are selectively alterable and tunable via a variety of applied forces.

In some embodiments, the at least one magnetically manipulable fluid receives at least one force sufficient to overcome the force of gravity. Generally, the at least one force may be any suitable force known in the art that facilitates producing the alterable optical structure described herein. In some embodiments, the at least one force is selected from the group consisting of, but is not limited to only being, magnetic forces, inertial forces, capillary forces, and/or combinations thereof. In some embodiments, the alterable optical structure is arranged such that the structure is located above the fluid reservoir, is horizontally adjacent to the fluid reservoir, is below the fluid reservoir, and/or some combination thereof.

In some embodiments, the at least one magnetically manipulable fluid includes a ferrofluid.

In some embodiments, the at least one fluid includes a non-ferrofluid. In these embodiments, the non-ferrofluid is not magnetically manipulable.

In some embodiments, the structure is rotatable to inertially manipulate the at least one magnetically manipulable fluid.

In some embodiments, the structure includes a porous structure. In some embodiments, the porous structure is a mesoporous structure. In some embodiments, the porous structure includes pores having average diameters in a range of from about 1 nm to about 1 mm.

In some embodiments, the porous structure includes wick-like structures.

In some embodiments, the structure includes a material selected from the group consisting of, but is not limited to only being, metals, polymers, ceramics, metamaterials, hyperbolic metamaterials, hydrophobic materials, hydrophobic coatings, hydrophilic materials, hydrophilic coatings, and/or combinations thereof.

In some embodiments, the structure is produced by additive manufacturing. In some embodiments, the structure is produced by polymer-based additive manufacturing. In some embodiments, the structure is produced by metal-based additive manufacturing. In some embodiments, the structure is produced by ceramic-based additive manufacturing.

In some embodiments, the at least one optical surface includes an optical surface selected from the group consisting of lenses, optical structures, photonic structures, mirrors, optical films, reflective optical films, metal liquid-like films (MELLFs), silver films, metamaterials, hyperbolic metamaterials, solar cells, and combinations thereof.

In some embodiments, the at least one optical surface is shaped as a geometric shape, a non-geometric shape, a paraboloid, an ellipsoid, a sphere, and/or combinations thereof. In other embodiments, the optical surface may have any other shape that enables the optical structure to function as described herein. In other embodiments, the optical surface is formed with a combination of various shapes at different locations.

Figure 2A:
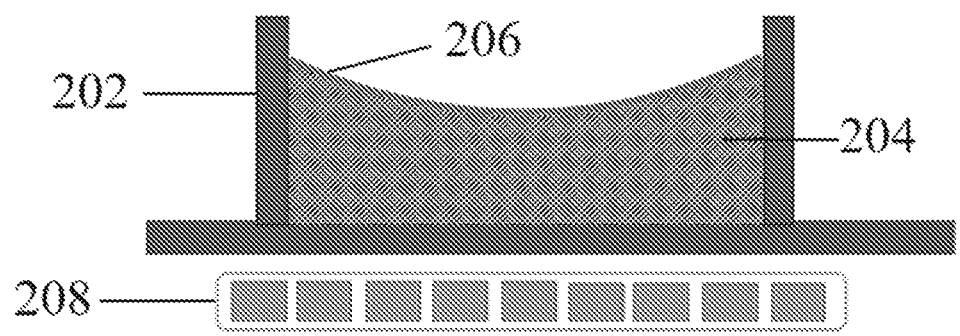
FIG. 2A is another alternative alterable optical structure in accordance with the present disclosure.

FIG. 2A depicts an exemplary alterable optical structure 200 in accordance with the present disclosure. The alterable optical structure 200 includes a structure 202. The structure 202 contains a fluid 204 and an optical surface 206 extending at least partially across the upper surface of the fluid 204. A magnetic field source 208 is below the structure 202. The structure 202 is rotatable (not shown). As depicted, the shape and dimensions of the optical surface 206 are controlled by the combination of capillary, magnetic, and/or inertial magnetic forces.

Figure 2B:
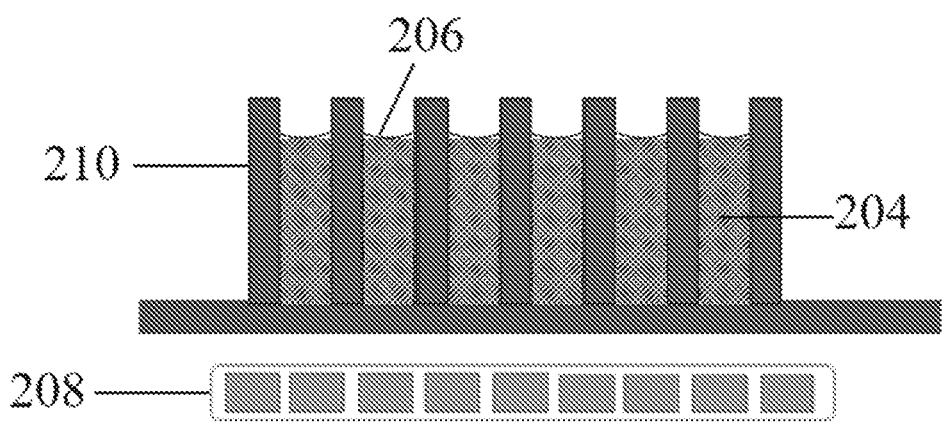
FIG. 2B is yet a further alternative alterable optical structure in accordance with the present disclosure.

FIG. 2B depicts another exemplary alterable optical structure 200 in accordance with the present disclosure. The alterable optical structure 200 includes a porous structure 210. The porous structure 210 contains a fluid 204 and an optical surface 206 extending at least partially across the upper surface of the fluid 204. A magnetic field source 208 is below the porous structure 210. The structure 202 is rotatable (not shown). As depicted, the shape and dimensions of the optical surface 206 are controlled by the combination of capillary, magnetic, and/or inertial magnetic forces.

In some embodiments, the alterable optical structure is a liquid mirror for use in a telescope. In some embodiments, the alterable optical structure is a liquid mirror for use in a solar energy system.

The exemplary embodiments described herein include a third method of altering an alterable optical structure. The third method includes inducing a magnetic force from the magnetic field source to magnetically manipulate the at least one magnetically manipulable fluid.

In some embodiments, the method also includes moving the at least one magnetically manipulable fluid through the structure via capillary action, wherein the structure includes a porous structure.

In some embodiments, the method further includes rotating the structure to inertially manipulate the at least one magnetically manipulable fluid.

The exemplary embodiments described herein include a fourth exemplary alterable optical structure. The fourth alterable optical structure includes at least one metamaterial, at least one magnetically manipulable fluid disposed on the metamaterial, and a magnetic field source oriented to magnetically manipulate the at least one magnetically manipulable fluid. The exemplary embodiments described herein facilitate producing optical structures that are alterable and tunable to achieve large tilt angles.

In some embodiments, the at least one metamaterial includes a metamaterial selected from the group consisting of hyperbolic metamaterials, electromagnetic metamaterials, electromagnetic bandgap metamaterials, negative-index metamaterials, single negative metamaterials, double positive medium metamaterials, bi-isotropic metamaterials, bianisotropic metamaterials, chiral metamaterials, frequency selective surface-based metamaterials, elastic metamaterials, mechanical metamaterials, acoustic metamaterials, structural metamaterials, thermal metamaterials, nonlinear metamaterials, Hall metamaterials, terahertz metamaterials, photonic metamaterials, tunable metamaterials, plasmonic metamaterials, and/or combinations thereof.

In some embodiments, the at least one metamaterial includes a material selected from the group consisting of aluminum, stainless steel, plastic composites, fiberglass-based composites, and combinations thereof.

In some embodiments, the at least one magnetically manipulable fluid includes a ferrofluid.

In some embodiments, the at least one fluid includes a non-ferrofluid. In these embodiments, the non-ferrofluid is not magnetically manipulable.

Generally, the magnetic field source may be any suitable magnetic field source known in the art that facilitates producing the alterable optical structure described herein. In some embodiments, the magnetic field source is selected from the group consisting of permanent magnets, electromagnets, paramagnets, ferromagnetic materials, and combinations thereof. In some embodiments, the magnetic field source includes a Halbach array.

In some embodiments, the alterable optical structure is a photonic hypercrystal.

The exemplary embodiments described herein include a fourth method of altering an alterable optical structure. The fourth method includes magnetically manipulating the at least one magnetically manipulable fluid to alter at least one optical property of the alterable optical structure.

In some embodiments, the at least one optical property is selected from the group consisting of opacity, transparency, refractive index, and/or combinations thereof.

The exemplary embodiments described herein include a solar energy system. The solar energy system includes an alterable optical structure described herein. The solar energy system is particularly beneficial to locally and globally follow the trajectory of the sun in the sky during the day. The solar energy system requires less space to receive sunlight and redirect it as desired compared to conventional solar energy systems that require large footprints and complicated mechanical sun-tracking mechanisms.

In some embodiments, the solar energy system further includes other solar energy system components, including but not limited to, solar power towers, solar absorbers, solar cells, and/or solar collectors.

In some embodiments, the solar energy system is configured to receive sunlight from the sun, a solar tower, a solar collector, a mirror, a control system, a power convertor, an energy storage system, or a combination thereof.

In some embodiments, the solar energy system includes a control system to alter the alterable optical structure and increase and/or optimize the amount of received sunlight.

The exemplary embodiments described herein include a method of using an alterable optical structure in a solar energy system. The method includes receiving sunlight at the solar energy system, wherein the solar energy system includes the alterable optical structure, and altering the alterable optical structure to increase and/or optimize the amount of received sunlight.

Further aspects of the present disclosure are provided by the subject matter of the following clauses:

1. An alterable optical structure comprising:
a fluid reservoir comprising:
at least one fluid; and
at least one optical surface extending at least partially across an upper surface of the at least one fluid;
a porous structure; and
at least one valve configured to selectively control fluid communication between the fluid reservoir and the porous structure;
wherein when the at least one valve is open, the at least one fluid can move through the porous structure via capillary action.

2. The alterable optical structure in accordance with the preceding clause, wherein the at least one fluid is configured to receive at least one force sufficient to overcome the force of gravity, wherein the at least one force is at least one of a magnetic force, an inertial force, a capillary force, and combinations thereof.

3. The alterable optical structure in accordance with any preceding clause, further comprising a magnetic field source oriented to magnetically manipulate the at least one fluid.

4. The alterable optical structure in accordance with any preceding clause, wherein the at least one fluid comprises a magnetically manipulable fluid.

5. The alterable optical structure in accordance with any preceding clause, wherein the at least one fluid comprises a ferrofluid.

6. The alterable optical structure in accordance with any preceding clause, wherein the porous structure is rotatable to inertially manipulate the at least one fluid.

7. The alterable optical structure in accordance with any preceding clause, wherein the porous structure comprises pores having average diameters in a range of from about 1 nm to about 1 mm.

8. The alterable optical structure in accordance with any preceding clause, wherein the porous structure comprises a material selected from the group consisting of metals, polymers, ceramics, metamaterials, hyperbolic metamaterials, hydrophobic materials, hydrophobic coatings, hydrophilic materials, hydrophilic coatings, and combinations thereof.

9. The alterable optical structure in accordance with any preceding clause, wherein the porous structure is produced by additive manufacturing.

10. The alterable optical structure in accordance with any preceding clause, wherein the at least one optical surface comprises an optical surface selected from the group consisting of lenses, optical structures, photonic structures, mirrors, optical films, reflective optical films, metal liquid-like films (MELLFs), silver films, metamaterials, hyperbolic metamaterials, solar cells, and combinations thereof.

11. The alterable optical structure in accordance with any preceding clause, wherein the at least one optical surface is shaped as at least one of a geometric shape, non-geometric shape, paraboloid, ellipsoid, sphere, and combinations thereof.

12. A method of altering an alterable optical structure comprising:
   a fluid reservoir comprising:
      at least one fluid; and
      at least one optical surface disposed on a surface of the at least one fluid;
   a porous structure; and
   at least one valve configured to selectively control fluid communication between the fluid reservoir and the porous structure, the method comprising:
   opening the at least one valve to enable the at least one fluid to move through the porous structure via capillary action.

13. The method in accordance with the preceding clause, further comprising magnetically manipulating the at least one fluid with a magnetic field source, wherein the at least one fluid comprises a magnetically manipulable fluid.

14. The method in accordance with any preceding clause, further comprising rotating the porous structure to inertially manipulate the at least one magnetically manipulable fluid.

15. An alterable optical structure comprising:
   at least one metamaterial;
   at least one magnetically manipulable fluid disposed on the metamaterial; and
   a magnetic field source oriented to magnetically manipulate the at least one magnetically manipulable fluid.

16. The alterable optical structure in accordance with the preceding clause, wherein the at least one metamaterial comprises a metamaterial selected from the group consisting of hyperbolic metamaterials, electromagnetic metamaterials, electromagnetic bandgap metamaterials, negative-index metamaterials, single negative metamaterials, double positive medium metamaterials, bi-isotropic metamaterials, bianisotropic metamaterials, chiral metamaterials, frequency selective surface-based metamaterials, elastic metamaterials, mechanical metamaterials, acoustic metamaterials, structural metamaterials, thermal metamaterials, nonlinear metamaterials, Hall metamaterials, terahertz metamaterials, photonic metamaterials, tunable metamaterials, plasmonic metamaterials, and combinations thereof.

17. The alterable optical structure in accordance with any preceding clause, wherein the at least one magnetically manipulable fluid comprises a ferrofluid.

18. The alterable optical structure in accordance with any preceding clause, wherein the alterable optical structure is a photonic hypercrystal.

19. A method of altering an alterable optical structure comprising:
   at least one metamaterial;
   at least one magnetically manipulable fluid disposed on the metamaterial; and
   a magnetic field source oriented to magnetically manipulate the at least one magnetically manipulable fluid, the method comprising:
   magnetically manipulating the at least one magnetically manipulable fluid to alter at least one optical property of the alterable optical structure.

20. The method in accordance with the preceding clause, wherein the at least one optical property is selected from the group consisting of opacity, transparency, refractive index, and combinations thereof.

21. An alterable optical structure comprising:
   a fluid reservoir comprising:
      at least one magnetically manipulable fluid; and
      at least one optical surface extending at least partially across an upper surface of the at least one magnetically manipulable fluid;
   a structure configured to receive the at least one magnetically manipulable fluid;
   a magnetic field source oriented to magnetically manipulate the at least one magnetically manipulable fluid; and
   at least one valve configured to selectively control fluid communication between the fluid reservoir and the structure;
   wherein when the at least one valve is open, the at least one magnetically manipulable fluid is allowed to move through the structure by a magnetic force applied by the magnetic field source.

22. The alterable optical structure in accordance with the preceding clause, wherein the at least one magnetically manipulable fluid is configured to receive at least one force sufficient to overcome the force of gravity, wherein the at least one force is at least one of a capillary force, an inertial force, and combinations thereof.

23. The alterable optical structure in accordance with any preceding clause, wherein the at least one magnetically manipulable fluid comprises a ferrofluid.

24. The alterable optical structure in accordance with any preceding clause, wherein the structure is rotatable to inertially manipulate the at least one magnetically manipulable fluid.

25. The alterable optical structure in accordance with any preceding clause, wherein the structure comprises a porous structure.

26. The alterable optical structure in accordance with any preceding clause, wherein the porous structure comprises pores having average diameters in a range of from about 1 nm to about 1 mm.

27. The alterable optical structure in accordance with any preceding clause, wherein the structure comprises a material selected from the group consisting of metals, polymers, ceramics, metamaterials, hyperbolic metamaterials, hydrophobic materials, hydrophobic coatings, hydrophilic materials, hydrophilic coatings, and combinations thereof.

28. The alterable optical structure in accordance with any preceding clause, wherein the structure is produced by additive manufacturing.

29. The alterable optical structure in accordance with any preceding clause, wherein the at least one optical surface comprises an optical surface selected from the group consisting of lenses, optical structures, photonic structures, mirrors, optical films, reflective optical films, metal liquid-like films (MELLFs), silver films, metamaterials, hyperbolic metamaterials, solar cells, and combinations thereof.

30. The alterable optical structure in accordance with any preceding clause, wherein the at least one optical surface is shaped as at least one of a geometric shape, non-geometric shape, paraboloid, ellipsoid, sphere, and combinations thereof.

31. A method of altering an alterable optical structure comprising:
   a fluid reservoir comprising:
      at least one magnetically manipulable fluid; and
      at least one optical surface extending at least partially across an upper surface of the at least one magnetically manipulable fluid;
   a structure configured to receive the at least one magnetically manipulable fluid;
   a magnetic field source oriented to magnetically manipulate the at least one magnetically manipulable fluid; and
   at least one valve configured to selectively control fluid communication between the fluid reservoir and the structure, the method comprising:

opening the at least one valve to allow the at least one magnetically manipulable fluid to move through the structure by a magnetic force induced by the magnetic field source.

32. The method in accordance with the preceding clause, further comprising rotating the structure to inertially manipulate the at least one magnetically manipulable fluid.

33. The method in accordance with any preceding clause, further comprising moving the at least one magnetically manipulable fluid through the structure via capillary action, wherein the structure comprises a porous structure.

34. An alterable optical structure comprising:
a structure containing:
at least one magnetically manipulable fluid;
at least one optical surface extending at least partially across an upper surface of the at least one magnetically manipulable fluid; and
a magnetic field source oriented to magnetically manipulate the at least one magnetically manipulable fluid.

35. The alterable optical structure in accordance with the preceding clause, wherein the at least one magnetically manipulable fluid is configured to receive at least one force sufficient to overcome the force of gravity, wherein the at least one force is at least one of a capillary force, a magnetic force, an inertial force, and combinations thereof.

36. The alterable optical structure in accordance with any preceding clause, wherein the at least one magnetically manipulable fluid comprises a ferrofluid.

37. The alterable optical structure in accordance with any preceding clause, wherein the structure is rotatable to inertially manipulate the at least one magnetically manipulable fluid.

38. The alterable optical structure in accordance with any preceding clause, wherein the structure comprises a porous structure.

39. The alterable optical structure in accordance with any preceding clause, wherein the porous structure comprises pores having average diameters in a range of from about 1 nm to about 1 mm.

40. The alterable optical structure in accordance with any preceding clause, wherein the structure comprises a material selected from the group consisting of metals, polymers, ceramics, metamaterials, hyperbolic metamaterials, hydrophobic materials, hydrophobic coatings, hydrophilic materials, hydrophilic coatings, and combinations thereof.

41. The alterable optical structure in accordance with any preceding clause, wherein the structure is produced by additive manufacturing.

42. The alterable optical structure in accordance with any preceding clause, wherein the at least one optical surface comprises an optical surface selected from the group consisting of lenses, optical structures, photonic structures, mirrors, optical films, reflective optical films, metal liquid-like films (MELLFs), silver films, metamaterials, hyperbolic metamaterials, solar cells, and combinations thereof.

43. The alterable optical structure in accordance with any preceding clause, wherein the at least one optical surface is shaped as at least one of a geometric shape, non-geometric shape, paraboloid, ellipsoid, sphere, and combinations thereof.

44. A method of altering an alterable optical structure comprising:
a structure containing:
at least one magnetically manipulable fluid;
at least one optical surface extending at least partially across an upper surface of the at least one magnetically manipulable fluid; and
a magnetic field source oriented to magnetically manipulate the at least one magnetically manipulable fluid, the method comprising:
inducing a magnetic force from the magnetic field source to magnetically manipulate the at least one magnetically manipulable fluid.

45. The method in accordance with the preceding clause, further comprising rotating the structure to inertially manipulate the at least one magnetically manipulable fluid.

46. The method in accordance with any preceding clause, further comprising moving the at least one magnetically manipulable fluid through the structure via capillary action, wherein the structure comprises a porous structure.

47. A solar energy system comprising the alterable optical structure in accordance with any preceding clause.

48. The solar energy system in accordance with the preceding clause, further comprising at least one component selected from the group consisting of solar power towers, solar absorbers, solar cells, solar collectors, and combinations thereof.

49. The solar energy system in accordance with any preceding clause, wherein the solar energy system is configured to receive sunlight from the sun, a solar tower, a solar collector, a mirror, a control system, a power convertor, an energy storage system, or a combination thereof.

50. The solar energy system in accordance with any preceding clause, wherein the solar energy system comprises a control system to alter the alterable optical structure and increase and/or optimize the amount of received sunlight.

51. A method of using an alterable optical structure in a solar energy system, the method comprising:
receiving sunlight at the solar energy system, wherein the solar energy system includes the alterable optical structure; and
altering the alterable optical structure to increase and/or optimize the amount of received sunlight.

References to "some embodiments" in the above description are not intended to be interpreted as excluding the existence of additional embodiments that also incorporate the recited features.

The present disclosure provides methods of quickly manipulating an optical surface (e.g., a reflecting surface) of a fluid such that the various benefits of adaptive optics may be available within and without a gravitational field. These benefits include optical focusing and counteraction of optical interferences such as atmospheric noise.

The present disclosure therefore outperforms conventional solutions such as manipulation of pieces of solid mirrors, which has the disadvantages of speed of response and a more divided, less continuous optical surface.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Although specific features of various embodiments of the invention may be shown in some drawings and not in others, this is for convenience only. Moreover, references to "some embodiments" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An alterable optical structure comprising:
    a fluid reservoir comprising:
        at least one fluid; and
        at least one optical surface extending at least partially across an upper surface of the at least one fluid;
    a porous structure, wherein the porous structure is rotatable to inertially manipulate the at least one fluid; and
    at least one valve configured to selectively control fluid communication between the fluid reservoir and the porous structure;
    wherein when the at least one valve is open, the at least one fluid can move through the porous structure via capillary action.

2. The alterable optical structure of claim 1, wherein the at least one fluid is oriented to receive at least one force sufficient to overcome the force of gravity, wherein the at least one force is at least one of a magnetic force, an inertial force, a capillary force, and combinations thereof.

3. The alterable optical structure of claim 1, further comprising a magnetic field source oriented to magnetically manipulate the at least one fluid.

4. The alterable optical structure of claim 1, wherein the at least one fluid comprises a magnetically manipulable fluid.

5. The alterable optical structure of claim 1, wherein the at least one fluid comprises a ferrofluid.

6. The alterable optical structure of claim 1, wherein the porous structure comprises pores having average diameters in a range of from about 1 nm to about 1 mm.

7. The alterable optical structure of claim 1, wherein the porous structure comprises a material selected from the group consisting of metals, polymers, ceramics, metamaterials, hyperbolic metamaterials, hydrophobic materials, hydrophobic coatings, hydrophilic materials, hydrophilic coatings, and combinations thereof.

8. The alterable optical structure of claim 1, wherein the porous structure is produced by additive manufacturing.

9. The alterable optical structure of claim 1, wherein the at least one optical surface comprises an optical surface selected from the group consisting of lenses, optical structures, photonic structures, mirrors, optical films, reflective optical films, metal liquid-like films (MELLFs), silver films, metamaterials, hyperbolic metamaterials, solar cells, and combinations thereof.

10. The alterable optical structure of claim 1, wherein the at least one optical surface is shaped as at least one of a geometric shape, a non-geometric shape, a paraboloid, an ellipsoid, a sphere, and combinations thereof.

11. A method of altering an alterable optical structure comprising:
    a fluid reservoir comprising:
        at least one fluid; and
        at least one optical surface extending at least partially across an upper surface of the at least one fluid;
    a porous structure; and
    at least one valve configured to selectively control fluid communication between the fluid reservoir and the porous structure, the method comprising:
    opening the at least one valve to enable the at least one fluid to move through the porous structure via capillary action; and
    rotating the porous structure to inertially manipulate the at least one fluid.

12. The method of claim 11, further comprising magnetically manipulating the at least one fluid with a magnetic field source, wherein the at least one fluid comprises a magnetically manipulable fluid.

* * * * *